July 16, 1935.  L. B. EHRLICH  2,008,493
DYNAMO ELECTRIC MACHINE FRAME
Filed July 23, 1930  3 Sheets-Sheet 1
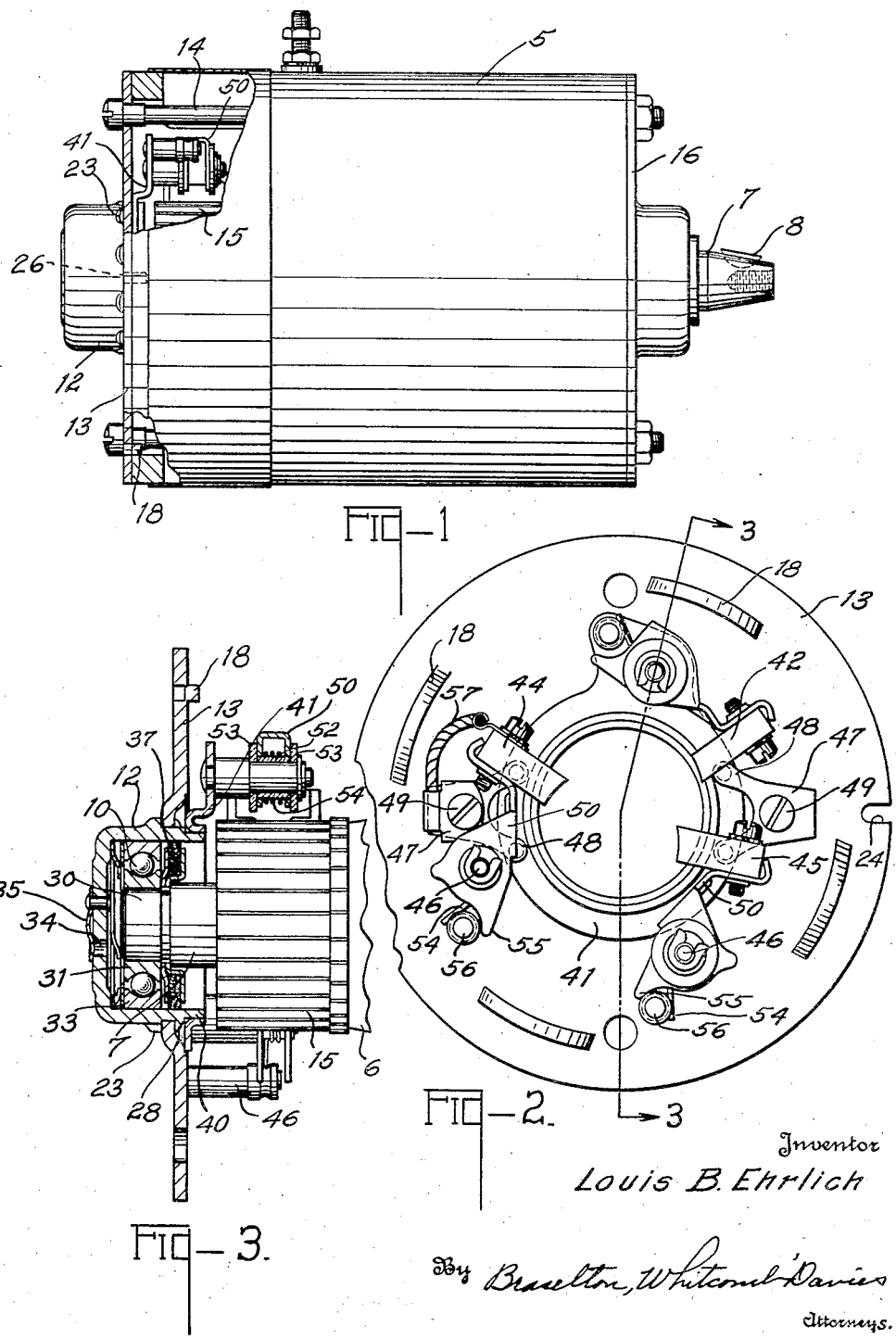
Inventor
Louis B. Ehrlich
By Braselton, Whitcomb Davies
Attorneys.

July 16, 1935.   L. B. EHRLICH   2,008,493
DYNAMO ELECTRIC MACHINE FRAME
Filed July 23, 1930   3 Sheets-Sheet 2

Inventor
Louis B. Ehrlich
By Braselton, Whitcomb Davies
Attorneys.

July 16, 1935.  L. B. EHRLICH  2,008,493
DYNAMO ELECTRIC MACHINE FRAME
Filed July 23, 1930   3 Sheets-Sheet 3
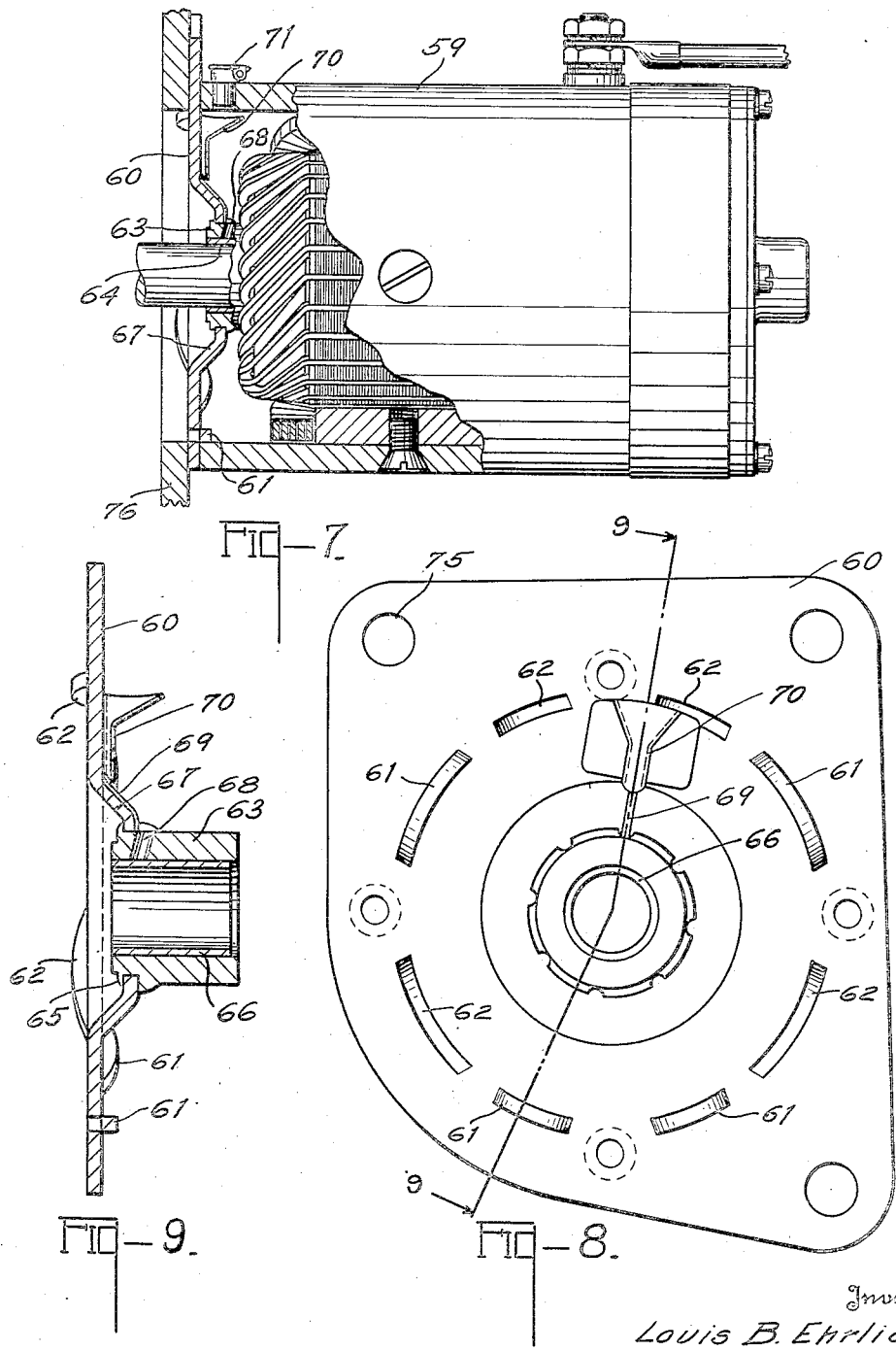
Inventor
Louis B. Ehrlich
By Braselton, Whitcomb Davies
Attorneys.

Patented July 16, 1935

2,008,493

UNITED STATES PATENT OFFICE 2,008,493

DYNAMO-ELECTRIC MACHINE FRAME

Louis B. Ehrlich, Toledo, Ohio, assignor to The Electric Auto-Lite Company, Toledo, Ohio, a corporation of Ohio Application July 23, 1930, Serial No. 470,123

10 Claims. (Cl. 308—22)

This invention relates to dynamo-electric machines and more particularly to the frame structure for those machines of the enclosed type such as are commonly employed as part of electric equipment for use with internal combustion engines.

The invention has for an object the provision of a simple and improved end frame structure for a machine of this character which may be formed of sheet material.

Another object is the provision of a structure of this character formed of a plurality of parts which may be afterwards assembled in fixed relation affording an inexpensive end frame assembly which may be manufactured in comparatively large quantities, the parts being interchangeable to facilitate service and replacement.

The invention further embraces the provision of an end frame structure in which the bearing support for the armature shaft is pressed or formed of sheet material coupled with novel means for fixedly securing the bearing support to the end plate.

Another object is the provision of a novel method and means for forming or shaping an element adapted to be received into a correspondingly formed or shaped member to prevent derangement of the parts.

The invention further contemplates the provision of means and an effective method of securing parts in fixed relationship.

Figure 5:
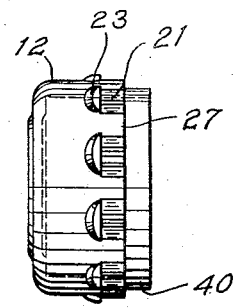
Figure 6:
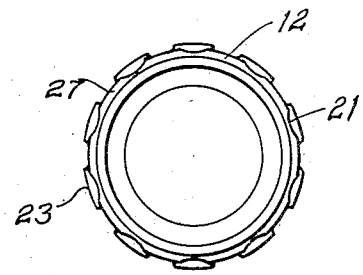
Figure 4:
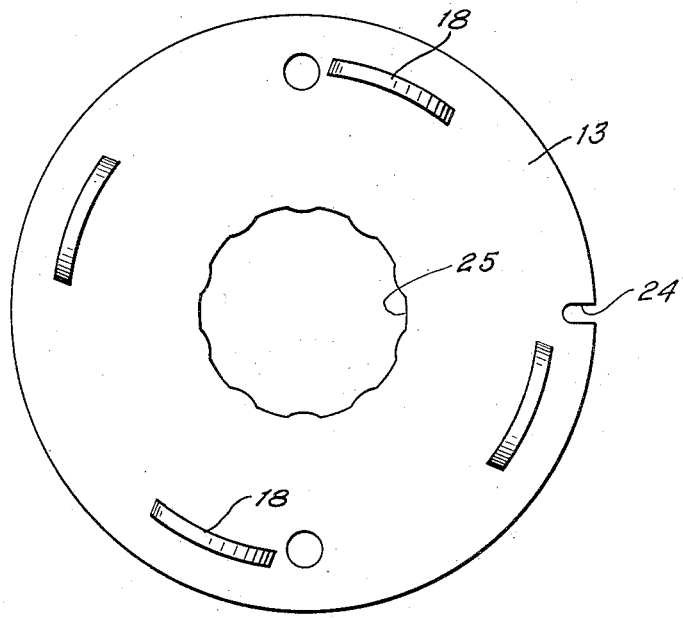

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of a dynamo-electric machine embodying my invention, parts being shown in section and illustrating the general arrangement of elements, Figure 2 is an end view of the end frame construction of my invention, Figure 3 is an enlarged vertical sectional view showing in detail the end frame construction of my invention and taken substantially on the line 3—3 of Figure 2, Figure 4 is an elevational view of the end plate per se of my invention, Figure 5 is a side elevational view of the bearing cup member per se forming a part of the frame structure, Figure 6 is an end elevational view of the structure shown in Figure 5, Figure 7 is a view showing the adaptation of the structure of my invention with a plane bearing, Figure 8 is an enlarged plain view of the end frame construction shown in Figure 7, Figure 9 is a transverse sectional view taken substantially on the line 9—9 of Figure 8.

Referring to the drawings in detail, I have shown the structure of my invention as incorporated in an electrical device of the type generally used in self-propelled vehicles, but it is to be understood that I contemplate the use of this structure wherever the same may be found to be applicable.

I have illustrated in Figures 1 to 6 inclusive one form of my invention as embodied in a dynamo-electric machine which comprises a cylindrical housing 5 within which is revolubly supported an armature 6 carried upon a shaft 7 which is adapted to be connected by means of a key 8 or other suitable means to an engine or other operating means. The commutator end of the armature shaft is journalled in a suitable anti-friction bearing 10 supported in a cup 12 fixed to the cover or end plate 13 which is secured to the housing 5 by means of bolts 14 preferably extending interiorly of the housing 5 and engaging the other end plate 16. The commutator 15 carried on the armature shaft 7 is in contact with suitable brushes which are suitably supported in a manner to be hereinafter described.

It is desirable in a structure of this character that the armature be retained in a central position with respect to the field poles of the machine for its efficient and successful operation. In this connection if the bearing supporting the armature shaft is eccentric with respect to the radial distance of the field poles from the axis of the armature, the magnetic flux on one side is greater than upon the other, and with the armature nearer one side than the other, the bearings will wear eccentrically and will cause the armature periphery to strike or rub against the pole pieces. In order to effect and maintain the armature in a central position with respect to the field pole pieces, the cover plate 13 is provided with suitable struck up arcuate projections 18 which engage the periphery of the casing 5 and serve to properly locate the plate with respect thereto and to center the bearing cup 12 so that the armature 15 may be properly disposed with respect to the pole pieces. The particular arrangement above described forms a part of the invention described and claimed in my copending application Serial Number 282,816, filed June 4, 1928. In order to properly position the plate 13 carrying the brush holder in the desired angular relationship with respect to the pole pieces, the end plates are provided with slots 24 which cooperate with pins 26 driven into the housing wall 5. This also prevents any circumferential displacement of the end plates with respect to the housing.

I have provided a novel and effective means for securing the bearing cup 12 to the end plate 13, this means being particularly illustrated in Figures 1 to 6 inclusive. The outer side wall of the cup 12 is provided with arcuate indentations or feather splines 21 as illustrated in Figure 5, the operation of forming these feather splines being by means of a tool (not shown) adapted to be brought into longitudinal engagement with the periphery of the cup 12, the tool travelling longitudinally of the axis of the cup forming the indentations or depressions 21 and at the same time carrying the severed metal to form the plurality of projections or shoulders 23 adjacent the terminus of the depressions 21. The end plate 13 is formed with an opening 25 whose contour is complementary to the exterior periphery of the recessed portion of the cup, the plate being positioned against the projections 23 when the parts are assembled as particularly shown in Figure 3. The irregular contour of the connection between the cup 12 and plate 13 prevents any relative movement between these parts. After assembly of the plate and cup, the portions 27 of the periphery of cup 12 interposed between the indentations 21 are swaged or ring-staked as at 28 against the surface of the plate 13 thus permanently securing the parts together.

In the embodiment of my invention illustrated in Figures 1 and 2, the armature shaft 7 is provided with a reduced end portion 30 which snugly fits the inner race 31 of an anti-friction bearing, the outer race 33 snugly fitting the inner walls of the cup 12, thus providing adequate support for the armature. The end of the cup 12 is provided with a small opening 34 for the introduction of oil into the bearing, this opening being normally closed by means of a suitable clip 35. The oil is prevented from flowing into the commutator and armature chamber by means of a suitable gland or washer 37 of felt or other suitable material.

The portion of the cup 12 projecting into the armature casing is formed with a reduced portion 40 which forms a suitable bearing support for a brush ring 41, this ring carrying a regulating or third brush. The ring 41 may be rotated about the axis of the armature shaft 7 in order to change the relative position of the regulating brush 42 with respect to the main brushes. In order to hold the brush ring 41 in adjusted position, I have provided a plurality of brackets 47, each having projecting fingers 48 adapted to frictionally engage and hold the ring in adjusted position, the brackets 47 being locked to the plate 13 by means of screws 49. The main brushes 44 and 45 as well as the regulating brush are carried by suitable brush holders.

Each brush holder comprises a substantially U-shaped bracket 50 suitably pivoted upon pin 46 and insulatingly supported by means of a bushing 52 and spacing washers 53, spring 54 encircling bushing 52 urging the brush into engagement with the commutator 15. The brush holder is provided with a projection 55 serving to limit the inward movement of the brush should the same become excessively worn, the portion 55 coacting with the pin 56 fixedly secured to plate 13; pin 56 also serves the purpose of preventing spring 54 from unwinding. I have illustrated a conducting element 57 serving to ground one of the brushes to the end plate which is retained in place by means of screw 49 which holds one of the brackets 47 to plate 13.

In Figures 7 to 9 inclusive I have illustrated my invention with a dynamo-electric machine in which bearings of the plain type are used. The end plate 60 enclosing one end of the housing 59 is provided with a struck up projection 61 for properly locating the same with respect to the housing. The inner center portion of the plate 60 is converged inwardly as at 67 and is secured to a bearing supporting bushing or sleeve 63. Bushing 63 is provided with feather splines and projections similar in construction to those of cup 12 previously described. Bushing 63 is fixedly secured to plate 60 by means of a swaged or ring-staked portion 65. Bearing bushing 66 is snugly fitted within the center opening in the sleeve 63 which forms a suitable bearing for a portion of the armature shaft 64. In order to lubricate this bearing, I have provided an opening 68 in the upper wall of the sleeve 63 which is in alignment with a groove 69 formed in the converging portion of the plate 60 which in turn is in alignment with a trough 70 spot welded or otherwise secured to the end plate 60, the trough adapted to receive oil through an oil cup 71 carried in an opening in the casing 59.

The construction of the end of the armature illustrated in Figure 7 lends itself particularly well in the saving of space in that the windings are so formed as to provide a suitable space adjacent the armature shaft into which space the sleeve 63 projects, thus making it possible for an adequate bearing support at this end of the armature without any portions of the bearing projecting outwardly of the plane of the plate 60. The plate 60 is also provided with arcuate projections 62 extending oppositely of the projections 61 for the purpose of enhancing the inversability and interchangeability of the end plate for various installations. The arcuate projection 62 also serves the purpose of locating the dynamo-electric machine with respect to a suitable support 76. The plate 60 is provided with suitable openings 75 adapted to receive securing means (not shown) for affixing the dynamo-electric machine to a suitable support 76 which may form part of an internal combustion engine or other structure with which my device may be used.

It is apparent that, within the scope of the invention modifications and different arrangements may be made other than is herein disclosed, and the present disclosure is illustrative merely, the invention comprehending all variations thereof.

What I claim is:

1. A cover for a dynamo-electric machine casing comprising a plate having a non-circular opening therein; a member having a portion or contour corresponding to that of the opening in said plate and secured thereto, the non-circular contour of said member terminating in a plurality of projections limiting movement of the member with respect to said plate.

2. A cover for a dynamo-electric machine casing comprising a plate having a polygonal opening therein; a substantially cylindrical member having a portion or contour complementary to that of the opening in said plate and secured thereto, the polygonal contour of said member terminating laterally in a plurality of projections acting as stop means for positioning the member with respect to said plate.

3. A cover for a dynamo-electric machine casing comprising a plate having an irregular opening therein; a member having a portion or contour complementary to that of the opening in said plate, the irregular contour of said member terminating in a plurality of projections acting as stop means for positioning the member with respect to said plate; and means integrally formed on said member adapted to embrace said plate to fixedly secure said plate and member together.

4. A cover for a dynamo-electric machine casing comprising a plate having a non-circular opening therein the walls of said opening being formed with spaced projections; a hollow member having a non-circular contour provided with spaced recesses complementary to the projection formed on said plate, the non-circular contour of said member terminating laterally in a plurality of projections for positioning the member with respect to said plate; and means integrally formed on said member adapted to embrace said plate to fixedly secure said plate and member together.

5. In combination, a plate having an opening of irregular contour; a bearing member having recesses terminating in laterally extending projections formed thereon, said member being received in the opening in said plate; and means on said member adapted to embrace said plate to hold parts in fixed relation.

6. In combination, a plate having an opening of polygonal contour; a bearing supporting member having recesses terminating in projections integrally formed thereon, said member being received in the opening in said plate; and means integrally formed on said member adapted to be distorted to embrace said plate to hold parts in fixed relation.

7. In combination, a bearing member having recesses terminating into radially extending projections integrally formed thereon; a plate having a complementary opening with projections corresponding to said recesses, said member being snugly received in the opening in said plate; and means integrally formed on said member embracing said plate to hold the parts in fixed relation.

8. An end cover for dynamo-electric machines comprising a plate of sheet material; a bearing member fixedly secured to said plate; a lubricating trough formed on a surface of said plate for conveying lubricant to the bearing member; and a lubricant receptacle of sheet material welded to the surface of said plate for communicating with said trough.

9. A cover for a dynamo electric machine casing comprising a plate having a non-circular opening therein, the walls of said opening being formed with spaced indentations; a hollow bearing member having a complementary portion adapted to be snugly received and secured in said plate opening; a lubricating trough formed on the surface of said plate; and an opening in a wall of said hollow member, said opening communicating with said trough.

10. A cover for a dynamo electric machine casing comprising a plate having a non-circular opening therein, the walls of said opening being formed with spaced indentations; a hollow bearing member having a complementary portion adapted to be snugly received and secured in said plate opening; a lubricating trough formed on the surface of said plate, and an opening in a wall of said hollow member, said opening communicating with said trough; and a sheet metal lubricant receptacle secured to the face of said plate and having communication with the trough for conveying lubricant to the bearing portion of said hollow member.

LOUIS B. EHRLICH.